United States Patent [19]

Ginder

[11] 4,034,436
[45] July 12, 1977

[54] CASTOR ASSEMBLY

[76] Inventor: Daniel L. Ginder, 24 Arbutus Court, Walnut Creek, Calif. 94595

[21] Appl. No.: 617,044

[22] Filed: Sept. 26, 1975

[51] Int. Cl.² .................................... B60B 33/00
[52] U.S. Cl. ............................ 16/18 A; 16/18 R
[58] Field of Search ............................. 16/18 A

[56] References Cited

U.S. PATENT DOCUMENTS

| 2,810,151 | 10/1957 | Lapham | 16/18 A |
|---|---|---|---|
| 3,928,888 | 12/1975 | Lapham | 16/35 R |

*Primary Examiner*—Werner H. Schroeder
*Assistant Examiner*—Conrad L. Berman
*Attorney, Agent, or Firm*—Flehr, Hohbach, Test, Albritton & Herbert

[57] ABSTRACT

A castor assembly is disclosed which includes a bearing block having a first bore for mounting a pintle, a second bore for mounting the spindle of a self-laying track member, and a downwardly open socket for mounting the trunnions of a castor roller. The pintle supports the bearing block on a frame or other structure for rotation about a vertical axis. The castor roller turns in its socket about a horizontal axis which is laterally spaced from the vertical axis. The track member is formed with an inner circular track which is in rotatable contact against the castor roller, and an outer circular edge of the track member encloses the roller and turns in close-spaced relationship with a lower truncated edge of the bearing block. The spindle of the track member rotates about an inclined axis lying in a plane passing through the horizontal axis. The inclined axis extends downwardly at an optimum angle which achieves a smooth castoring action when in operation.

5 Claims, 6 Drawing Figures

U.S. Patent  July 12, 1977  4,034,436
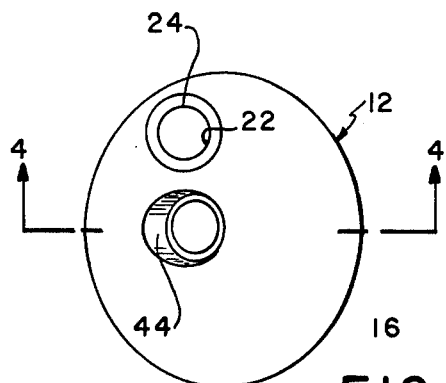
FIG.—3
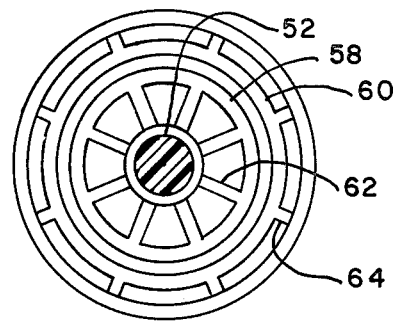
FIG.—6
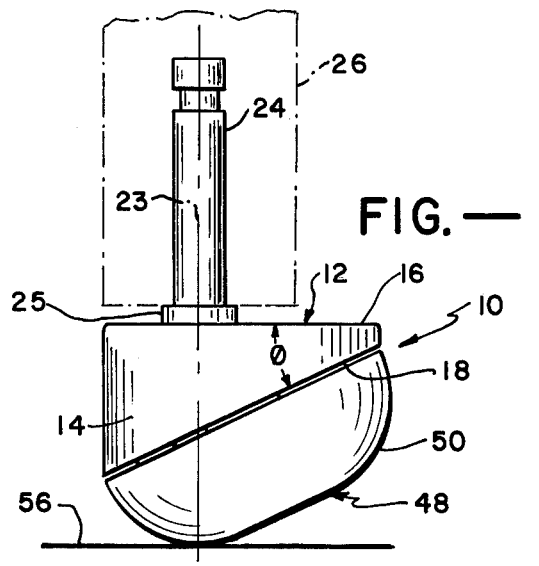
FIG.—1
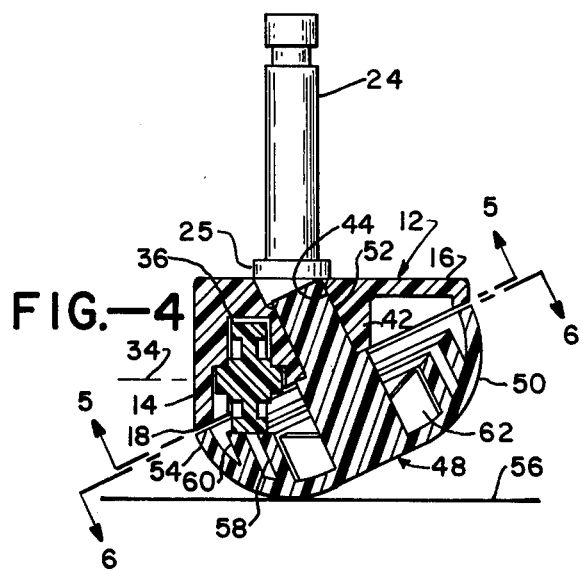
FIG.—4
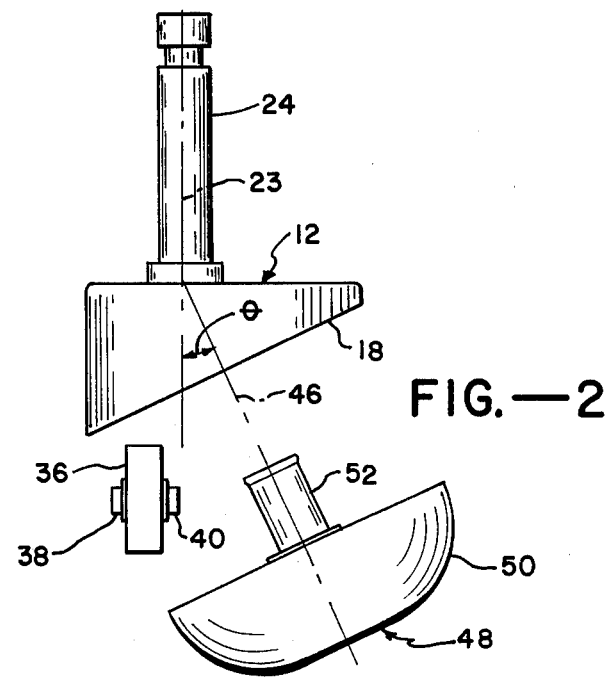
FIG.—2
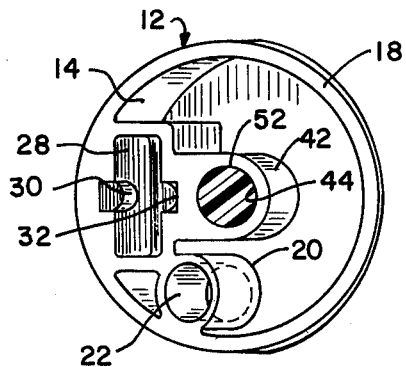
FIG.—5

CASTOR ASSEMBLY

BACKGROUND OF THE INVENTION

This invention relates in general to castor assemblies employing a self-laying track for supporting a frame or other structure to move over a floor or other surface.

Self-laying track castor assemblies have previously been provided. The Pat. to Lapham No. 2,810,151 discloses a castor which employs a disc journaled on a bearing block so as to turn and lay a track for a castor roller which is also journaled on the bearing block. The castor of the Lapham patent overcomes the problem of the relatively small diameter castor roller dropping into cracks or perforations as it is rolled along a floor. However, such a castor does not provide a smooth castoring action. Thus, for certain applications the castor resists movement or slips across the underlying floor, depending upon conditions such as the weight of the object being moved and the nature of the floor surface. In addition, the castor of Lapham is relatively complicated and expensive to construct in view of the fact that the parts do not lend themselves to fabrication by low cost plastic injection molding techniques.

OBJECTS AND SUMMARY OF THE INVENTION

It is a general object of the invention to provide a new and improved castor assembly of the selflaying track type which will obviate the disadvantages and limitations of existing castor rollers.

Another object is to provide a castor assembly of the type described in which the self-laying track member is journaled for rotation on a bearing block along an axis which is inclined at an optimum angle with respect to a vertical direction to achieve an improved castoring action between the track member, bearing block and castor roller.

Another object is to provide a castor assembly of the type described which is relatively simple in design and construction and in which the elements may be inexpensively fabricated from synthetic polymer materials by the use of injection molding techniques or the like.

Another object is to provide a castor assembly of the type described in which the castor roller is completely enclosed by the self-laying track member so that the assembly is aesthetically appealing.

The invention in summary comprises a castor assembly which includes an integral bearing block adapted to be mounted by a pintle on a frame or other structure for rotation about a horizontal axis which is laterally spaced from the vertical axis. A self-laying track member is provided with a cup-shaped outer surface which contacts the floor or other surface. A spindle on the track member is journaled on the bearing block for rotation about an inclined axis lying in a plane passing through the horizontal axis and extending downwardly at an optimum angle within the range of 22½° to 25° from a vertical direction. An inner circular track formed in the track member rotatably contacts the castor roller and holds the latter in the sockets.

The foregoing and additional objects and features of the invention will become apparent from the following description in which the preferred embodiments have been described in detail in conjunction with the accompanying drawings.

BRIEF DESCRIPTION OF THE DRAWINGS

FIG. 1 is a side elevational view of the castor assembly of the invention shown as mounted below a frame structure.

FIG. 2 is an exploded view of the castor assembly of FIG. 1.

FIG. 3 is a top plan view of the castor assembly.

FIG. 4 is a cross-sectional view taken along the line 4—4 of FIG. 3.

FIG. 5 is a cross-sectional view taken along line 5—5 of FIG. 4.

FIG. 6 is a cross-sectional view taken along the line 6—6 of FIG. 4.

DESCRIPTION OF THE PREFERRED EMBODIMENTS

In the drawings FIG. 1 illustrates generally at 10 a preferred embodiment of the castor assembly of the invention. Castor assembly 10 includes a bearing block 12 integrally formed of a suitable rigid material, preferably a synthetic polymer such as nylon, which is adapted to be fabricated by conventional injection molding techniques or the like. The bearing block is shaped with a cylindrical wall 14 enclosed at its upper end with a flat end wall 16. The wall 14 is truncated to form a downwardly open circular edge 18 which lies in a plane disposed at an angle $\phi$ in the range of 22½° to 25° with the plane of end wall 16. A journal 20 formed integral with the block 10 defines a bore 22 which opens along the side margin of the end wall and extends along a vertical axis 23. A pintle 24 is provided with a circular shoulder 25 which abuts end wall 16. The end of the pintle below its shoulder is adapted to be mounted in bore 22, and the upper end of the pintle is adapted to be mounted in a frame or other structure 26 which is to be supported, e.g. the leg of a bed, chair, or the like.

A downwardly open box-shaped chamber 28 is formed integrally within bearing block 12, and a pair of spaced-apart semi-circular sockets 30, 32 are molded on opposite sides of this chamber to define a journal extending along a horizontal axis 34 which is laterally spaced from vertical axis 23. A circular castor roller 36 molded at its opposite sides with integral trunnions 38, 40 is provided, and the trunnions seat within the sockets 30, 32 to support the roller for rotation about the horizontal axis. Castor roller 36 is fabricated from a suitable rigid durable material, preferably a synthetic polymer such as that sold under the trademark Celcon M 90-02 by the Celanese corporation.

Another cylindrical journal 42 is molded integrally within block 10 to define a bore 44 which opens through end wall 16 and extends along an inclined axis 46 lying in a plane passing through horizontal axis 34 of the roller. Axis 46 inclines downwardly at an optimum angle $\theta$ within the range of 22½° to 25° from a vertical direction. In the illustrated embodiment the angle $\theta$ is 25°, and is equal to the angle $\phi$ between end wall 16 and lower edge 18 of the bearing block.

A self-laying track member 48 having a cup-shaped lower end 50 and an integral upwardly inclined spindle 52 is provided. Track member 48 is fabricated from a suitable rigid durable material, preferably a synthetic polymer such as Celcon M 90-02. The distal end of spindle 52 is journaled within bore 44 of the bearing block for rotation about the inclined axis 46. As best illustrated in FIG. 4 the diameter of the outer rim 54 of the track member is commensurate with the diameter of block lower edge 18 so that these two edges turn in close-spaced relationship while at the same time concealing from view castor roller 36 in an attractive enclosure.

The outer surface 50 of the track member is rounded for rotatable contact against the floor or other surface 56. A pair of annular ribs 58, 60 are molded integrally within the track member concentric with the base of spindle 52. The upper ends of the ribs are bevelled at an angle from axis 46, and this angle is equal to the previously described angle $\theta$. The upper ends of the ribs thus form an endless track which in turn under and support roller 36 as the castor assembly is moved. At the same time, the ribs serve to hold the roller within its socket. A series of radially extending webs 62 are molded integrally between spindle 52 and inner rib 58 to provide structural integrity and strength, while an additional series of radially extending webs 64 are molded integrally between outer rib 60 and outer rim 54.

The use and operation of castor assembly 10 is as follows. The lower end of pintle 24 is inserted into bore 22 of the bearing block until shoulder 25 abuts end wall 16. The upper end of the spindle is then mounted in frame 26 for rotation about vertical axis 23. The trunnions of castor roller 36 are inserted into sockets 30, 32 and spindle 52 of the track member is inserted into bore 44 of bearing block, with the ribs 58 and 60 serving to hold the roller in its socket. The assembled castor is then placed against and rolled over the surface of the floor. The castoring action takes place as the bearing block rotates about the vertical axis of pintle 24 conjointly with rotation of castor roller 36 about its horizontal axis 34. At the same time, track member 48 rotates about the inclined axis 46 of the spindle to lay a track underneath the roller. The critical angle $\theta$ defined by the inclined spindle axis about which the track member rotates achieves improved coaction between the elements for a smooth castoring action. As a result there is less resistance to moving the frame or other structure in the desired direction over the floor.

While the foregoing embodiment is at present considered to be preferred it is understood that numerous variations and modifications may be made therein by those skilled in the art and it is intended to cover in the appended claims all such variations and modifications as fall within the true spirit and scope of the invention.

What is claimed is:

1. A castor assembly for supporting a frame or other structure for movement over a floor or other surface, comprising the combination of a bearing block mountable on the frame or other structure for rotation about a vertical axis, a castor roller mounted on the bearing block for rotation about a horizontal axis which is laterally spaced from the vertical axis, a self-laying track member having an outer surface which contacts the floor or other surface, said track member being mounted on the bearing block for rotation about an inclined axis lying in a plane passing through said horizontal axis, said inclined axis extending downwardly at an angle $\theta$ in the range of 22½° to 25° from a vertical direction, said track member having means forming an inner circular track concentric with the inclined axis and in rotatable contact against the castor roller.

2. A castor assembly as in claim 1 in which the bearing block comprises a cylinder having its longitudinal axis parallel with and laterally spaced from said vertical axis, said cylinder being truncated to form a circular lower edge which lies in a plane defining an angle with a horizontal lower edge which lies in a plane which is substantially equal to said angle $\theta$, and said track member is formed with an outer circular rim concentric with the inclined axis and disposed about the circular track, the diameter of the rim of the track member being commensurate with the diameter of the edge of the bearing block and with the castor roller being enclosed within and substantially concealed from view by the bearing block and track member.

3. A castor assembly as in claim 1 in which the angle $\theta$ is 25°.

4. A castor assembly as in claim 1 in which the bearing block comprises a cylinder of integral construction including an upper flat end wall, means forming a first bore through a side of the end wall along the vertical axis, a pintle having a lower end journaled in said first bore and an upper end adapted to be mounted on the frame or other structure, means forming a second bore through the end wall along said inclined axis, means forming a pair of downwardly open, semi-circular spaced apart sockets in the cylinder aligned along a horizontal axis, said castor roller including a pair of trunnions journaled in respective sockets, said track member including a cup-shaped outer surface for contacting the floor or other surface, said means forming the circular track contacting the rim of the castor roller for holding said trunnions in the sockets, and said track member is formed with a spindle which is concentric with the track and journaled in the second bore of the bearing block.

5. A castor assembly as in claim 4 in which the means forming the circular track comprises at least one circular rib formed within the track member concentric with the inclined axis, said rib having an upper end beveled at an angle from the inclined axis substantially equal to said angle $\theta$ with the beveled end being in rolling contact with the castor roller and holding the latter in the sockets.

* * * * *